(12) United States Patent
Sarwer et al.

(10) Patent No.: US 12,395,631 B2
(45) Date of Patent: Aug. 19, 2025

(54) SIGNALING OF MAXIMUM TRANSFORM SIZE AND RESIDUAL CODING METHOD

(71) Applicant: ALIBABA GROUP HOLDING LIMITED, Grand Cayman (KY)

(72) Inventors: Mohammed Golam Sarwer, Cupertino, CA (US); Jiancong Luo, Skillman, NJ (US); Yan Ye, San Diego, CA (US)

(73) Assignee: Alibaba Group Holding Limited, Grand Cayman (KY)

( * ) Notice: Subject to any disclaimer, the term of this patent is extended or adjusted under 35 U.S.C. 154(b) by 0 days.

(21) Appl. No.: 17/162,417

(22) Filed: Jan. 29, 2021

(65) Prior Publication Data

US 2021/0266548 A1    Aug. 26, 2021

Related U.S. Application Data

(60) Provisional application No. 62/980,117, filed on Feb. 21, 2020.

(51) Int. Cl.
*H04N 19/96* (2014.01)
*H04N 19/122* (2014.01)
*H04N 19/176* (2014.01)
*H04N 19/186* (2014.01)
*H04N 19/46* (2014.01)

(52) U.S. Cl.
CPC ......... *H04N 19/122* (2014.11); *H04N 19/176* (2014.11); *H04N 19/186* (2014.11); *H04N 19/46* (2014.11); *H04N 19/96* (2014.11)

(58) Field of Classification Search
CPC .. H04N 19/122; H04N 19/176; H04N 19/186; H04N 19/46; H04N 19/96
USPC ..................................... 375/240.18
See application file for complete search history.

(56) References Cited

U.S. PATENT DOCUMENTS

| | | | |
|---|---|---|---|
| 2015/0249828 A1 | 9/2015 | Rosewarne et al. | |
| 2016/0219290 A1* | 7/2016 | Zhao | H04N 19/167 |
| 2021/0076074 A1* | 3/2021 | Chang | H04N 19/96 |
| 2021/0136399 A1* | 5/2021 | Li | H04N 19/184 |
| 2022/0303567 A1* | 9/2022 | Jung | H04N 19/46 |

FOREIGN PATENT DOCUMENTS

| | | | | |
|---|---|---|---|---|
| CN | 111050171 A | * | 4/2020 | .......... H04N 19/122 |
| WO | WO 2021/061631 A1 | | 4/2021 | |

OTHER PUBLICATIONS

Bross et al., "Versatile Video Coding (Draft 8)," JVET-Q2001-vD, 17th Meeting: Brussels, BE, Jan. 7-17, 2020, 509 pages.

(Continued)

*Primary Examiner* — Yulin Sun
(74) *Attorney, Agent, or Firm* — Finnegan, Henderson, Farabow, Garrett & Dunner, LLP

(57) ABSTRACT

The present disclosure provides systems and methods for signaling a maximum transform size and a residual coding method. According to certain disclosed embodiments, the methods include: receiving a bitstream comprising a set of pictures, determining, according to the received bitstream, a value of a coded tree block size; and determining, based on the value of the coded tree block size, whether to signal a flag indicating a maximum transform size for luma samples.

15 Claims, 10 Drawing Sheets

(56) References Cited

OTHER PUBLICATIONS

Chen et al., "Algorithm Description of Joint Exploration Test Model 7 (JEM 7)," JVET-G1001-v1, 7$^{th}$ Meeting: Torino, IT, Jul. 13-21, 2017, 50 pages.

International Telecommunications Union "Series H: Audiovisual and Multimedia Systems Infrastructure of audiovisual services—Coding of moving video", ITU-T Telecommunication Standardization Sector of ITU, Apr. 2013, 317 pages.

Jem, https://jvet.hhi.fraunhofer.de/svn/svn_HMJEMSoftware.

Segall et al., "Joint Call for Proposals on Video Compression with Capability beyond HEVC," JVET-H1002 (v6), 8$^{th}$ Meeting: Macao, CN, Oct. 18-24, 2017, 27 pages.

Sullivan et al., "Overview of the High Efficiency Video Coding (HEVC) Standard," IEE Transactions on Circuits and Systems for Video Technology, vol. 22, No. 12, pp. 1649-1668 (2012).

PCT International Search Report and Written Opinion mailed Apr. 14, 2021 issued in corresponding International Application No. PCT/US2021/015693 (7 pgs.).

European Patent Office Communication issued for Application No. 21757507.5 the Supplementary European Search Report (Art. 153(7) EPC) and the European search opinion dated Jun. 23, 2023, 10 pages.

Bross et al., "Versatile Video Coding (Draft 6)," JVET-O2002-vE, 15$^{th}$ Meeting: Gothenburg, SE, Jul. 3-12, 2019, 455 pages.

Deng et al., "Non-CE6: Cleanups of maximum transform size related syntax elements," JVET-P0405, 16$^{th}$ Meeting: Geneva, CH, Oct. 1-11, 2019, 3 pages.

Du et al., "On signaling CTU size in SPS," JVET-P0580, 16$^{th}$ Meeting: Geneva, CH, Oct. 1-11, 2019.

Sarwer et al., "AHG9: Transform and transform-skip related HLS clean-up," JVET-R0097-v2, JVET-R0097-v2, 18$^{th}$ Meeting: by teleconference, Apr. 15-24, 2020, 3 pages.

* cited by examiner

SIGNALING OF MAXIMUM TRANSFORM SIZE AND RESIDUAL CODING METHOD

CROSS-REFERENCE TO RELATED APPLICATIONS

The present disclosure claims priority to U.S. provisional application No. 62/980,117, filed on Feb. 21, 2020, which is incorporated herein by reference in its entirety.

TECHNICAL FIELD

The present disclosure generally relates to video processing, and more particularly, to methods and apparatuses for signaling a maximum transform size and a residual coding method.

BACKGROUND

A video is a set of static pictures (or "frames") capturing the visual information. To reduce the storage memory and the transmission bandwidth, a video can be compressed before storage or transmission and decompressed before display. The compression process is usually referred to as encoding and the decompression process is usually referred to as decoding. There are various video coding formats which use standardized video coding technologies, most commonly based on prediction, transform, quantization, entropy coding and in-loop filtering. The video coding standards, such as the High Efficiency Video Coding (HEVC/H.265) standard, the Versatile Video Coding (VVC/H.266) standard, and AVS standards, specifying the specific video coding formats, are developed by standardization organizations. With more and more advanced video coding technologies being adopted in the video standards, the coding efficiency of the new video coding standards get higher and higher.

SUMMARY OF THE DISCLOSURE

The embodiments of the present disclosure provide a method and apparatus for signaling a maximum transform size. In some exemplary embodiments, the method includes: receiving a bitstream comprising a set of pictures, determining, according to the received bitstream, a value of a coded tree block size; and determining, based on the value of the coded tree block size, whether to signal a flag indicating a maximum transform size for luma samples.

The apparatus can include a memory storing a set of instructions; and one or more processors configured to execute the set of instructions to cause the apparatus to perform: receiving a bitstream comprising a set of pictures, determining, according to the received bitstream, a value of a coded tree block size; and determining, based on the value of the coded tree block size, whether to signal a flag indicating a maximum transform size for luma samples.

The embodiments of the present disclosure further provide a non-transitory computer readable medium that stores a set of instructions that is executable by at least one processor of a computer to cause the computer to perform a method for signaling a maximum transform size, the method comprising: receiving a bitstream comprising a set of pictures, determining, according to the received bitstream, a value of a coded tree block size; and determining, based on the value of the coded tree block size, whether to signal a flag indicating a maximum transform size for luma samples.

The embodiments of the present disclosure also provide a method and apparatus for signaling a residual coding method. In some exemplary embodiments, the method includes: receiving a bitstream comprising a set of pictures, determining, according to the received bitstream, a value of a first flag indicating whether a transform skip mode is enabled; and determining, based on the value of the first flag, whether to signal a second flag indicating a residual coding method.

The apparatus can include a memory storing a set of instructions; and one or more processors configured to execute the set of instructions to cause the apparatus to perform: receiving a bitstream comprising a set of pictures, determining, according to the received bitstream, a value of a first flag indicating whether a transform skip mode is enabled; and determining, based on the value of the first flag, whether to signal a second flag indicating a residual coding method.

The embodiments of the present disclosure further provide a non-transitory computer readable medium that stores a set of instructions that is executable by at least one processor of a computer to cause the computer to perform a method for signaling a residual coding method, the method comprising: receiving a bitstream comprising a set of pictures, determining, according to the received bitstream, a value of a first flag indicating whether a transform skip mode is enabled; and determining, based on the value of the first flag, whether to signal a second flag indicating a residual coding method.

BRIEF DESCRIPTION OF THE DRAWINGS

Embodiments and various aspects of the present disclosure are illustrated in the following detailed description and the accompanying figures. Various features shown in the figures are not drawn to scale.

DETAILED DESCRIPTION

Figure 1:
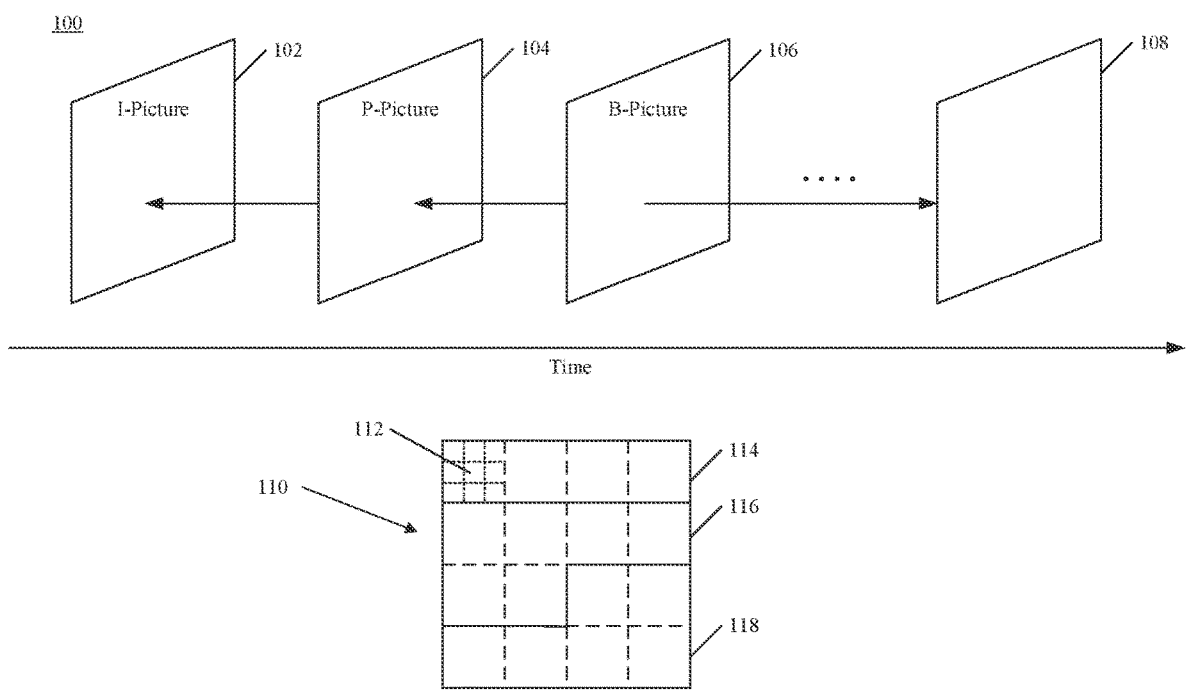
FIG. 1 is a schematic diagram illustrating structures of an example video sequence, consistent with some embodiments of the present disclosure.

Reference will now be made in detail to exemplary embodiments, examples of which are illustrated in the accompanying drawings. The following description refers to the accompanying drawings in which the same numbers in different drawings represent the same or similar elements unless otherwise represented. The implementations set forth in the following description of exemplary embodiments do not represent all implementations consistent with the invention. Instead, they are merely examples of apparatuses and methods consistent with aspects related to the invention as recited in the appended claims. Particular aspects of the present disclosure are described in greater detail below. The terms and definitions provided herein control, if in conflict with terms and/or definitions incorporated by reference.

The Joint Video Experts Team (JVET) of the ITU-T Video Coding Expert Group (ITU-T VCEG) and the ISO/IEC Moving Picture Expert Group (ISO/IEC MPEG) is currently developing the Versatile Video Coding (VVC/H.266) standard. The VVC standard is aimed at doubling the compression efficiency of its predecessor, the High Efficiency Video Coding (HEVC/H.265) standard. In other words, VVC's goal is to achieve the same subjective quality as HEVC/H.265 using half the bandwidth.

To achieve the same subjective quality as HEVC/H.265 using half the bandwidth, the JVET has been developing technologies beyond HEVC using the joint exploration model (JEM) reference software. As coding technologies were incorporated into the JEM, the JEM achieved substantially higher coding performance than HEVC.

The VVC standard has been developed recent, and continues to include more coding technologies that provide better compression performance. VVC is based on the same hybrid video coding system that has been used in modern video compression standards such as HEVC, H.264/AVC, MPEG2, H.263, etc.

A video is a set of static pictures (or "frames") arranged in a temporal sequence to store visual information. A video capture device (e.g., a camera) can be used to capture and store those pictures in a temporal sequence, and a video playback device (e.g., a television, a computer, a smartphone, a tablet computer, a video player, or any end-user terminal with a function of display) can be used to display such pictures in the temporal sequence. Also, in some applications, a video capturing device can transmit the captured video to the video playback device (e.g., a computer with a monitor) in real-time, such as for surveillance, conferencing, or live broadcasting.

For reducing the storage space and the transmission bandwidth needed by such applications, the video can be compressed before storage and transmission and decompressed before the display. The compression and decompression can be implemented by software executed by a processor (e.g., a processor of a generic computer) or specialized hardware. The module for compression is generally referred to as an "encoder," and the module for decompression is generally referred to as a "decoder." The encoder and decoder can be collectively referred to as a "codec." The encoder and decoder can be implemented as any of a variety of suitable hardware, software, or a combination thereof. For example, the hardware implementation of the encoder and decoder can include circuitry, such as one or more microprocessors, digital signal processors (DSPs), application-specific integrated circuits (ASICs), field-programmable gate arrays (FPGAs), discrete logic, or any combinations thereof. The software implementation of the encoder and decoder can include program codes, computer-executable instructions, firmware, or any suitable computer-implemented algorithm or process fixed in a computer-readable medium. Video compression and decompression can be implemented by various algorithms or standards, such as MPEG-1, MPEG-2, MPEG-4, H.26x series, or the like. In some applications, the codec can decompress the video from a first coding standard and re-compress the decompressed video using a second coding standard, in which case the codec can be referred to as a "transcoder."

The video encoding process can identify and keep useful information that can be used to reconstruct a picture and disregard unimportant information for the reconstruction. If the disregarded, unimportant information cannot be fully reconstructed, such an encoding process can be referred to as "lossy." Otherwise, it can be referred to as "lossless." Most encoding processes are lossy, which is a tradeoff to reduce the needed storage space and the transmission bandwidth.

The useful information of a picture being encoded (referred to as a "current picture") include changes with respect to a reference picture (e.g., a picture previously encoded and reconstructed). Such changes can include position changes, luminosity changes, or color changes of the pixels, among which the position changes are mostly concerned. Position changes of a group of pixels that represent an object can reflect the motion of the object between the reference picture and the current picture.

A picture coded without referencing another picture (i.e., it is its own reference picture) is referred to as an "I-picture." A picture coded using a previous picture as a reference picture is referred to as a "P-picture." A picture coded using both a previous picture and a future picture as reference pictures (i.e., the reference is "bi-directional") is referred to as a "B-picture."

FIG. 1 illustrates structures of an example video sequence 100, according to some embodiments of the present disclosure. Video sequence 100 can be a live video or a video having been captured and archived. Video 100 can be a real-life video, a computer-generated video (e.g., computer game video), or a combination thereof (e.g., a real-life video with augmented-reality effects). Video sequence 100 can be inputted from a video capture device (e.g., a camera), a video archive (e.g., a video file stored in a storage device) containing previously captured video, or a video feed interface (e.g., a video broadcast transceiver) to receive video from a video content provider.

As shown in FIG. 1, video sequence 100 can include a series of pictures arranged temporally along a timeline, including pictures 102, 104, 106, and 108. Pictures 102-106 are continuous, and there are more pictures between pictures 106 and 108. In FIG. 1, picture 102 is an I-picture, the reference picture of which is picture 102 itself. Picture 104 is a P-picture, the reference picture of which is picture 102, as indicated by the arrow. Picture 106 is a B-picture, the reference pictures of which are pictures 104 and 108, as indicated by the arrows. In some embodiments, the reference picture of a picture (e.g., picture 104) can be not immediately preceding or following the picture. For example, the reference picture of picture 104 can be a picture preceding picture 102. It should be noted that the reference pictures of pictures 102-106 are only examples, and the present disclosure does not limit embodiments of the reference pictures as the examples shown in FIG. 1.

Typically, video codecs do not encode or decode an entire picture at one time due to the computing complexity of such tasks. Rather, they can split the picture into basic segments, and encode or decode the picture segment by segment. Such basic segments are referred to as basic processing units ("BPUs") in the present disclosure. For example, structure 110 in FIG. 1 shows an example structure of a picture of video sequence 100 (e.g., any of pictures 102-108). In structure 110, a picture is divided into 4×4 basic processing units, the boundaries of which are shown as dash lines. In some embodiments, the basic processing units can be referred to as "macroblocks" in some video coding standards (e.g., MPEG family, H.261, H.263, or H.264/AVC), or as "coding tree units" ("CTUs") in some other video coding standards (e.g., H.265/HEVC or H.266/VVC). The basic processing units can have variable sizes in a picture, such as 128×128, 64×64, 32×32, 16×16, 4×8, 16×32, or any arbitrary shape and size of pixels. The sizes and shapes of the basic processing units can be selected for a picture based on the balance of coding efficiency and levels of details to be kept in the basic processing unit. A CTU is the largest block unit and can include as many as 128×128 luma samples (plus the corresponding chroma samples depending on the chroma format). A CTU may be further partitioned into coding units (CUs) using quad-tree, binary tree, ternary tree, or a combination thereof.

The basic processing units can be logical units, which can include a group of different types of video data stored in a computer memory (e.g., in a video frame buffer). For example, a basic processing unit of a color picture can include a luma component (Y) representing achromatic brightness information, one or more chroma components (e.g., Cb and Cr) representing color information, and associated syntax elements, in which the luma and chroma components can have the same size of the basic processing unit. The luma and chroma components can be referred to as "coding tree blocks" ("CTBs") in some video coding standards (e.g., H.265/HEVC or H.266/VVC). Any operation performed to a basic processing unit can be repeatedly performed to each of its luma and chroma components.

Video coding has multiple stages of operations, examples of which are shown in FIGS. 2A-2B and FIGS. 3A-3B. For each stage, the size of the basic processing units can still be too large for processing, and thus can be further divided into segments referred to as "basic processing sub-units" in the present disclosure. In some embodiments, the basic processing sub-units can be referred to as "blocks" in some video coding standards (e.g., MPEG family, H.261, H.263, or H.264/AVC), or as "coding units" ("CUs") in some other video coding standards (e.g., H.265/HEVC or H.266/VVC). A basic processing sub-unit can have the same or smaller size than the basic processing unit. Similar to the basic processing units, basic processing sub-units are also logical units, which can include a group of different types of video data (e.g., Y, Cb, Cr, and associated syntax elements) stored in a computer memory (e.g., in a video frame buffer). Any operation performed to a basic processing sub-unit can be repeatedly performed to each of its luma and chroma components. It should be noted that such division can be performed to further levels depending on processing needs. It should also be noted that different stages can divide the basic processing units using different schemes.

Figure 2A:
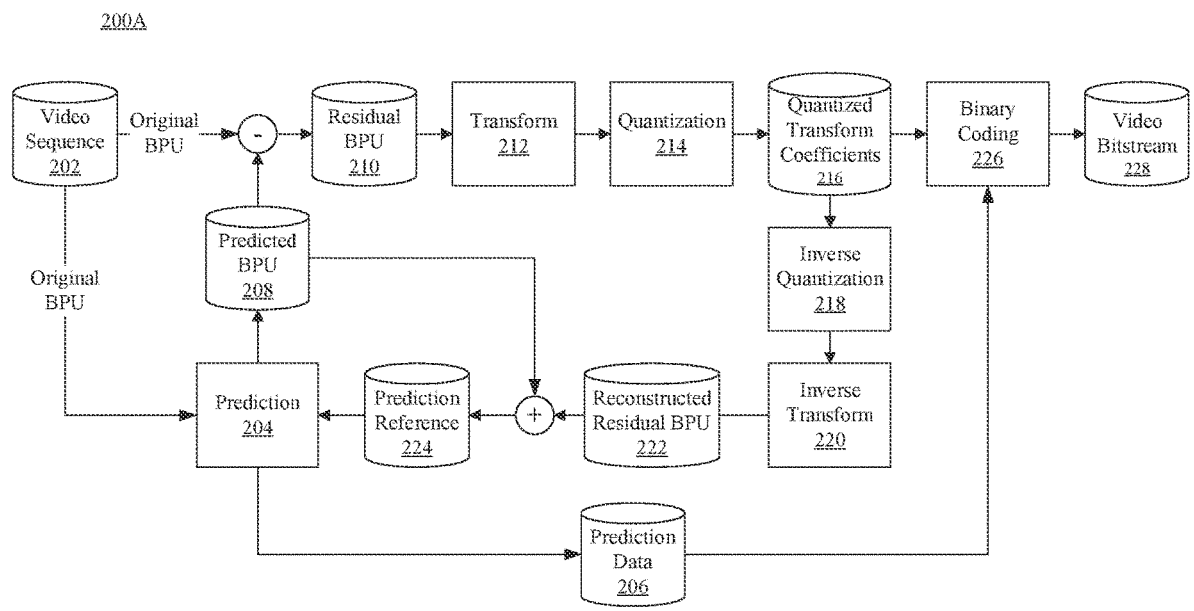
FIG. 2A is a schematic diagram illustrating an exemplary encoding process of a hybrid video coding system, consistent with some embodiments of the present disclosure.
Figure 2B:
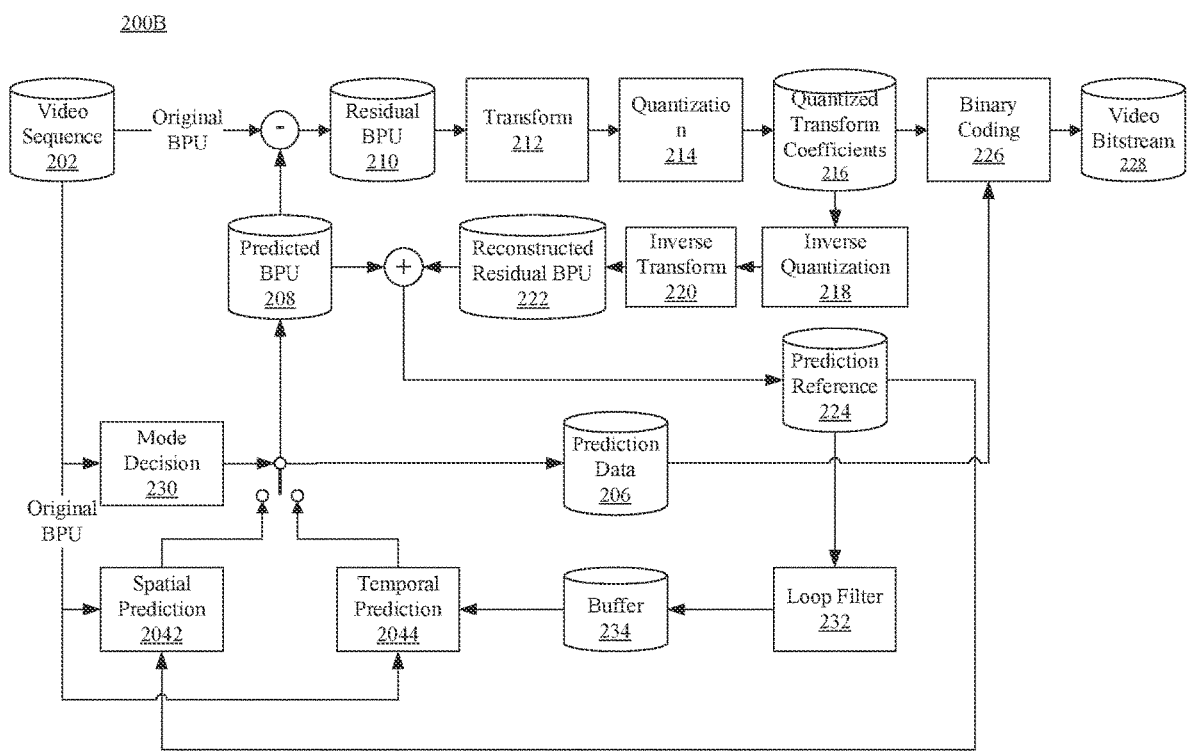
FIG. 2B is a schematic diagram illustrating another exemplary encoding process of a hybrid video coding system, consistent with some embodiments of the present disclosure.

For example, at a mode decision stage (an example of which is shown in FIG. 2B), the encoder can decide what prediction mode (e.g., intra-picture prediction or inter-picture prediction) to use for a basic processing unit, which can be too large to make such a decision. The encoder can split the basic processing unit into multiple basic processing sub-units (e.g., CUs as in H.265/HEVC or H.266/VVC), and decide a prediction type for each individual basic processing sub-unit.

For another example, at a prediction stage (an example of which is shown in FIGS. 2A-2B), the encoder can perform prediction operation at the level of basic processing sub-units (e.g., CUs). However, in some cases, a basic processing sub-unit can still be too large to process. The encoder can further split the basic processing sub-unit into smaller segments (e.g., referred to as "prediction blocks" or "PBs" in H.265/HEVC or H.266/VVC), at the level of which the prediction operation can be performed.

For another example, at a transform stage (an example of which is shown in FIGS. 2A-2B), the encoder can perform a transform operation for residual basic processing sub-units (e.g., CUs). However, in some cases, a basic processing sub-unit can still be too large to process. The encoder can further split the basic processing sub-unit into smaller segments (e.g., referred to as "transform blocks" or "TBs" in H.265/HEVC or H.266/VVC), at the level of which the transform operation can be performed. It should be noted that the division schemes of the same basic processing sub-unit can be different at the prediction stage and the transform stage. For example, in H.265/HEVC or H.266/VVC, the prediction blocks and transform blocks of the same CU can have different sizes and numbers.

In structure 110 of FIG. 1, basic processing unit 112 is further divided into 3×3 basic processing sub-units, the boundaries of which are shown as dotted lines. Different basic processing units of the same picture can be divided into basic processing sub-units in different schemes.

In some implementations, to provide the capability of parallel processing and error resilience to video encoding and decoding, a picture can be divided into regions for processing, such that, for a region of the picture, the encoding or decoding process can depend on no information from any other region of the picture. In other words, each region of the picture can be processed independently. By doing so, the codec can process different regions of a picture in parallel, thus increasing the coding efficiency. Also, when data of a region is corrupted in the processing or lost in network transmission, the codec can correctly encode or decode other regions of the same picture without reliance on the corrupted or lost data, thus providing the capability of error resilience. In some video coding standards, a picture can be divided into different types of regions. For example, H.265/HEVC and H.266/VVC provide two types of regions: "slices" and "tiles." It should also be noted that different pictures of video sequence 100 can have different partition schemes for dividing a picture into regions.

For example, in FIG. 1, structure 110 is divided into three regions 114, 116, and 118, the boundaries of which are shown as solid lines inside structure 110. Region 114 includes four basic processing units. Each of regions 116 and 118 includes six basic processing units. It should be noted that the basic processing units, basic processing sub-units, and regions of structure 110 in FIG. 1 are only examples, and the present disclosure does not limit embodiments thereof.

FIG. 2A illustrates a schematic diagram of an example encoding process 200A, consistent with embodiments of the disclosure. For example, the encoding process 200A can be performed by an encoder. As shown in FIG. 2A, the encoder can encode video sequence 202 into video bitstream 228 according to process 200A. Similar to video sequence 100 in FIG. 1, video sequence 202 can include a set of pictures (referred to as "original pictures") arranged in a temporal order. Similar to structure 110 in FIG. 1, each original picture of video sequence 202 can be divided by the encoder into basic processing units, basic processing sub-units, or regions for processing. In some embodiments, the encoder can perform process 200A at the level of basic processing units for each original picture of video sequence 202. For example, the encoder can perform process 200A in an iterative manner, in which the encoder can encode a basic processing unit in one iteration of process 200A. In some embodiments, the encoder can perform process 200A in parallel for regions (e.g., regions 114-118) of each original picture of video sequence 202.

In FIG. 2A, the encoder can feed a basic processing unit (referred to as an "original BPU") of an original picture of video sequence 202 to prediction stage 204 to generate prediction data 206 and predicted BPU 208. The encoder can subtract predicted BPU 208 from the original BPU to generate residual BPU 210. The encoder can feed residual BPU 210 to transform stage 212 and quantization stage 214 to generate quantized transform coefficients 216. The encoder can feed prediction data 206 and quantized transform coefficients 216 to binary coding stage 226 to generate video bitstream 228. Components 202, 204, 206, 208, 210, 212, 214, 216, 226, and 228 can be referred to as a "forward path." During process 200A, after quantization stage 214, the encoder can feed quantized transform coefficients 216 to inverse quantization stage 218 and inverse transform stage 220 to generate reconstructed residual BPU 222. The encoder can add reconstructed residual BPU 222 to predicted BPU 208 to generate prediction reference 224, which is used in prediction stage 204 for the next iteration of process 200A. Components 218, 220, 222, and 224 of process 200A can be referred to as a "reconstruction path." The reconstruction path can be used to ensure that both the encoder and the decoder use the same reference data for prediction.

The encoder can perform process 200A iteratively to encode each original BPU of the original picture (in the forward path) and generate predicted reference 224 for encoding the next original BPU of the original picture (in the reconstruction path). After encoding all original BPUs of the original picture, the encoder can proceed to encode the next picture in video sequence 202.

Referring to process 200A, the encoder can receive video sequence 202 generated by a video capturing device (e.g., a camera). The term "receive" used herein can refer to receiving, inputting, acquiring, retrieving, obtaining, reading, accessing, or any action in any manner for inputting data.

At prediction stage 204, at a current iteration, the encoder can receive an original BPU and prediction reference 224, and perform a prediction operation to generate prediction data 206 and predicted BPU 208. Prediction reference 224 can be generated from the reconstruction path of the previous iteration of process 200A. The purpose of prediction stage 204 is to reduce information redundancy by extracting prediction data 206 that can be used to reconstruct the original BPU as predicted BPU 208 from prediction data 206 and prediction reference 224.

Ideally, predicted BPU 208 can be identical to the original BPU. However, due to non-ideal prediction and reconstruction operations, predicted BPU 208 is generally slightly different from the original BPU. For recording such differences, after generating predicted BPU 208, the encoder can subtract it from the original BPU to generate residual BPU 210. For example, the encoder can subtract values (e.g., greyscale values or RGB values) of pixels of predicted BPU 208 from values of corresponding pixels of the original BPU. Each pixel of residual BPU 210 can have a residual value as a result of such subtraction between the corresponding pixels of the original BPU and predicted BPU 208. Compared with the original BPU, prediction data 206 and residual BPU 210 can have fewer bits, but they can be used to reconstruct the original BPU without significant quality deterioration. Thus, the original BPU is compressed.

To further compress residual BPU 210, at transform stage 212, the encoder can reduce spatial redundancy of residual BPU 210 by decomposing it into a set of two-dimensional "base patterns," each base pattern being associated with a "transform coefficient." The base patterns can have the same size (e.g., the size of residual BPU 210). Each base pattern can represent a variation frequency (e.g., frequency of brightness variation) component of residual BPU 210. None of the base patterns can be reproduced from any combinations (e.g., linear combinations) of any other base patterns. In other words, the decomposition can decompose variations of residual BPU 210 into a frequency domain. Such a decomposition is analogous to a discrete Fourier transform of a function, in which the base patterns are analogous to the base functions (e.g., trigonometry functions) of the discrete Fourier transform, and the transform coefficients are analogous to the coefficients associated with the base functions.

Different transform algorithms can use different base patterns. Various transform algorithms can be used at transform stage 212, such as, for example, a discrete cosine transform, a discrete sine transform, or the like. The transform at transform stage 212 is invertible. That is, the encoder can restore residual BPU 210 by an inverse operation of the transform (referred to as an "inverse transform"). For example, to restore a pixel of residual BPU 210, the inverse transform can be multiplying values of corresponding pixels of the base patterns by respective associated coefficients and adding the products to produce a weighted sum. For a video coding standard, both the encoder and decoder can use the same transform algorithm (thus the same base patterns). Thus, the encoder can record only the transform coefficients, from which the decoder can reconstruct residual BPU 210 without receiving the base patterns from the encoder. Compared with residual BPU 210, the transform coefficients can have fewer bits, but they can be used to reconstruct residual BPU 210 without significant quality deterioration. Thus, residual BPU 210 is further compressed.

The encoder can further compress the transform coefficients at quantization stage 214. In the transform process, different base patterns can represent different variation frequencies (e.g., brightness variation frequencies). Because human eyes are generally better at recognizing low-frequency variation, the encoder can disregard information of high-frequency variation without causing significant quality deterioration in decoding. For example, at quantization stage 214, the encoder can generate quantized transform coefficients 216 by dividing each transform coefficient by an integer value (referred to as a "quantization parameter") and rounding the quotient to its nearest integer. After such an operation, some transform coefficients of the high-frequency base patterns can be converted to zero, and the transform coefficients of the low-frequency base patterns can be converted to smaller integers. The encoder can disregard the zero-value quantized transform coefficients 216, by which the transform coefficients are further compressed. The quantization process is also invertible, in which quantized transform coefficients 216 can be reconstructed to the transform coefficients in an inverse operation of the quantization (referred to as "inverse quantization").

Because the encoder disregards the remainders of such divisions in the rounding operation, quantization stage 214 can be lossy. Typically, quantization stage 214 can contribute the most information loss in process 200A. The larger the information loss is, the fewer bits the quantized transform coefficients 216 can need. For obtaining different levels of information loss, the encoder can use different values of the quantization parameter or any other parameter of the quantization process.

At binary coding stage 226, the encoder can encode prediction data 206 and quantized transform coefficients 216 using a binary coding technique, such as, for example, entropy coding, variable length coding, arithmetic coding, Huffman coding, context-adaptive binary arithmetic coding, or any other lossless or lossy compression algorithm. In some embodiments, besides prediction data 206 and quantized transform coefficients 216, the encoder can encode other information at binary coding stage 226, such as, for example, a prediction mode used at prediction stage 204, parameters of the prediction operation, a transform type at transform stage 212, parameters of the quantization process (e.g., quantization parameters), an encoder control parameter (e.g., a bitrate control parameter), or the like. The encoder can use the output data of binary coding stage 226 to generate video bitstream 228. In some embodiments, video bitstream 228 can be further packetized for network transmission.

Referring to the reconstruction path of process 200A, at inverse quantization stage 218, the encoder can perform inverse quantization on quantized transform coefficients 216 to generate reconstructed transform coefficients. At inverse transform stage 220, the encoder can generate reconstructed residual BPU 222 based on the reconstructed transform coefficients. The encoder can add reconstructed residual BPU 222 to predicted BPU 208 to generate prediction reference 224 that is to be used in the next iteration of process 200A.

It should be noted that other variations of the process 200A can be used to encode video sequence 202. In some embodiments, stages of process 200A can be performed by the encoder in different orders. In some embodiments, one or more stages of process 200A can be combined into a single stage. In some embodiments, a single stage of process 200A can be divided into multiple stages. For example, transform stage 212 and quantization stage 214 can be combined into a single stage. In some embodiments, process 200A can include additional stages. In some embodiments, process 200A can omit one or more stages in FIG. 2A.

FIG. 2B illustrates a schematic diagram of another example encoding process 200B, consistent with embodiments of the disclosure. Process 200B can be modified from process 200A. For example, process 200B can be used by an encoder conforming to a hybrid video coding standard (e.g., H.26x series). Compared with process 200A, the forward path of process 200B additionally includes mode decision stage 230 and divides prediction stage 204 into spatial prediction stage 2042 and temporal prediction stage 2044. The reconstruction path of process 200B additionally includes loop filter stage 232 and buffer 234.

Generally, prediction techniques can be categorized into two types: spatial prediction and temporal prediction. Spatial prediction (e.g., an intra-picture prediction or "intra prediction") can use pixels from one or more already coded neighboring BPUs in the same picture to predict the current BPU. That is, prediction reference 224 in the spatial prediction can include the neighboring BPUs. The spatial prediction can reduce the inherent spatial redundancy of the picture. Temporal prediction (e.g., an inter-picture prediction or "inter prediction") can use regions from one or more already coded pictures to predict the current BPU. That is, prediction reference 224 in the temporal prediction can include the coded pictures. The temporal prediction can reduce the inherent temporal redundancy of the pictures.

Referring to process 200B, in the forward path, the encoder performs the prediction operation at spatial prediction stage 2042 and temporal prediction stage 2044. For example, at spatial prediction stage 2042, the encoder can perform the intra prediction. For an original BPU of a picture being encoded, prediction reference 224 can include one or more neighboring BPUs that have been encoded (in the forward path) and reconstructed (in the reconstructed path) in the same picture. The encoder can generate predicted BPU 208 by extrapolating the neighboring BPUs. The extrapolation technique can include, for example, a linear extrapolation or interpolation, a polynomial extrapolation or interpolation, or the like. In some embodiments, the encoder can perform the extrapolation at the pixel level, such as by extrapolating values of corresponding pixels for each pixel of predicted BPU 208. The neighboring BPUs used for extrapolation can be located with respect to the original BPU from various directions, such as in a vertical direction (e.g., on top of the original BPU), a horizontal direction (e.g., to the left of the original BPU), a diagonal direction (e.g., to the down-left, down-right, up-left, or up-right of the original BPU), or any direction defined in the used video coding standard. For the intra prediction, prediction data 206 can include, for example, locations (e.g., coordinates) of the used neighboring BPUs, sizes of the used neighboring BPUs, parameters of the extrapolation, a direction of the used neighboring BPUs with respect to the original BPU, or the like.

For another example, at temporal prediction stage 2044, the encoder can perform the inter prediction. For an original BPU of a current picture, prediction reference 224 can include one or more pictures (referred to as "reference pictures") that have been encoded (in the forward path) and reconstructed (in the reconstructed path). In some embodiments, a reference picture can be encoded and reconstructed BPU by BPU. For example, the encoder can add reconstructed residual BPU 222 to predicted BPU 208 to generate a reconstructed BPU. When all reconstructed BPUs of the same picture are generated, the encoder can generate a reconstructed picture as a reference picture. The encoder can perform an operation of "motion estimation" to search for a matching region in a scope (referred to as a "search window") of the reference picture. The location of the search window in the reference picture can be determined based on the location of the original BPU in the current picture. For example, the search window can be centered at a location having the same coordinates in the reference picture as the original BPU in the current picture and can be extended out for a predetermined distance. When the encoder identifies (e.g., by using a pel-recursive algorithm, a block-matching algorithm, or the like) a region similar to the original BPU in the search window, the encoder can determine such a region as the matching region. The matching region can have different dimensions (e.g., being smaller than, equal to, larger than, or in a different shape) from the original BPU. Because the reference picture and the current picture are temporally separated in the timeline (e.g., as shown in FIG. 1), it can be deemed that the matching region "moves" to the location of the original BPU as time goes by. The encoder can record the direction and distance of such a motion as a "motion vector." When multiple reference pictures are used (e.g., as picture 106 in FIG. 1), the encoder can search for a matching region and determine its associated motion vector for each reference picture. In some embodiments, the encoder can assign weights to pixel values of the matching regions of respective matching reference pictures.

The motion estimation can be used to identify various types of motions, such as, for example, translations, rotations, zooming, or the like. For inter prediction, prediction data 206 can include, for example, locations (e.g., coordinates) of the matching region, the motion vectors associated with the matching region, the number of reference pictures, weights associated with the reference pictures, or the like.

For generating predicted BPU 208, the encoder can perform an operation of "motion compensation." The motion compensation can be used to reconstruct predicted BPU 208 based on prediction data 206 (e.g., the motion vector) and prediction reference 224. For example, the encoder can move the matching region of the reference picture according to the motion vector, in which the encoder can predict the original BPU of the current picture. When multiple reference pictures are used (e.g., as picture 106 in FIG. 1), the encoder can move the matching regions of the reference pictures according to the respective motion vectors and average pixel values of the matching regions. In some embodiments, if the encoder has assigned weights to pixel values of the matching regions of respective matching reference pictures, the encoder can add a weighted sum of the pixel values of the moved matching regions.

In some embodiments, the inter prediction can be unidirectional or bidirectional. Unidirectional inter predictions can use one or more reference pictures in the same temporal direction with respect to the current picture. For example, picture 104 in FIG. 1 is a unidirectional inter-predicted picture, in which the reference picture (e.g., picture 102) precedes picture 104. Bidirectional inter predictions can use one or more reference pictures at both temporal directions with respect to the current picture. For example, picture 106 in FIG. 1 is a bidirectional inter-predicted picture, in which the reference pictures (e.g., pictures 104 and 108) are at both temporal directions with respect to picture 104.

Still referring to the forward path of process 200B, after spatial prediction 2042 and temporal prediction stage 2044, at mode decision stage 230, the encoder can select a prediction mode (e.g., one of the intra prediction or the inter prediction) for the current iteration of process 200B. For example, the encoder can perform a rate-distortion optimization technique, in which the encoder can select a prediction mode to minimize a value of a cost function depending on a bit rate of a candidate prediction mode and distortion of the reconstructed reference picture under the candidate prediction mode. Depending on the selected prediction mode, the encoder can generate the corresponding predicted BPU 208 and predicted data 206.

In the reconstruction path of process 200B, if intra prediction mode has been selected in the forward path, after generating prediction reference 224 (e.g., the current BPU that has been encoded and reconstructed in the current picture), the encoder can directly feed prediction reference 224 to spatial prediction stage 2042 for later usage (e.g., for extrapolation of a next BPU of the current picture). If the inter prediction mode has been selected in the forward path, after generating prediction reference 224 (e.g., the current picture in which all BPUs have been encoded and reconstructed), the encoder can feed prediction reference 224 to loop filter stage 232, at which the encoder can apply a loop filter to prediction reference 224 to reduce or eliminate distortion (e.g., blocking artifacts) introduced by the inter prediction. The encoder can apply various loop filter techniques at loop filter stage 232, such as, for example, deblocking, sample adaptive offsets, adaptive loop filters, or the like. The loop-filtered reference picture can be stored in buffer 234 (or "decoded picture buffer") for later use (e.g., to be used as an inter-prediction reference picture for a future picture of video sequence 202). The encoder can store one or more reference pictures in buffer 234 to be used at temporal prediction stage 2044. In some embodiments, the encoder can encode parameters of the loop filter (e.g., a loop filter strength) at binary coding stage 226, along with quantized transform coefficients 216, prediction data 206, and other information.

Figure 3A:
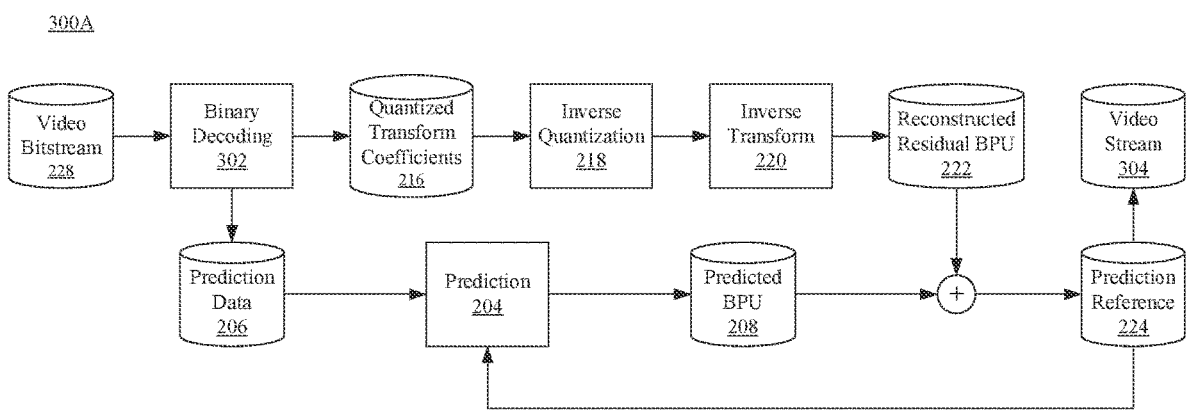
FIG. 3A is a schematic diagram illustrating an exemplary decoding process of a hybrid video coding system, consistent with some embodiments of the present disclosure.

FIG. 3A illustrates a schematic diagram of an example decoding process 300A, consistent with embodiments of the disclosure. Process 300A can be a decompression process corresponding to the compression process 200A in FIG. 2A. In some embodiments, process 300A can be similar to the reconstruction path of process 200A. A decoder can decode video bitstream 228 into video stream 304 according to process 300A. Video stream 304 can be very similar to video sequence 202. However, due to the information loss in the compression and decompression process (e.g., quantization stage 214 in FIGS. 2A-2B), generally, video stream 304 is not identical to video sequence 202. Similar to processes 200A and 200B in FIGS. 2A-2B, the decoder can perform process 300A at the level of basic processing units (BPUs) for each picture encoded in video bitstream 228. For example, the decoder can perform process 300A in an iterative manner, in which the decoder can decode a basic processing unit in one iteration of process 300A. In some embodiments, the decoder can perform process 300A in parallel for regions (e.g., regions 114-118) of each picture encoded in video bitstream 228.

In FIG. 3A, the decoder can feed a portion of video bitstream 228 associated with a basic processing unit (referred to as an "encoded BPU") of an encoded picture to binary decoding stage 302. At binary decoding stage 302, the decoder can decode the portion into prediction data 206 and quantized transform coefficients 216. The decoder can feed quantized transform coefficients 216 to inverse quantization stage 218 and inverse transform stage 220 to generate reconstructed residual BPU 222. The decoder can feed prediction data 206 to prediction stage 204 to generate predicted BPU 208. The decoder can add reconstructed residual BPU 222 to predicted BPU 208 to generate predicted reference 224. In some embodiments, predicted reference 224 can be stored in a buffer (e.g., a decoded picture buffer in a computer memory). The decoder can feed predicted reference 224 to prediction stage 204 for performing a prediction operation in the next iteration of process 300A.

The decoder can perform process 300A iteratively to decode each encoded BPU of the encoded picture and generate predicted reference 224 for encoding the next encoded BPU of the encoded picture. After decoding all encoded BPUs of the encoded picture, the decoder can output the picture to video stream 304 for display and proceed to decode the next encoded picture in video bitstream 228.

At binary decoding stage 302, the decoder can perform an inverse operation of the binary coding technique used by the encoder (e.g., entropy coding, variable length coding, arithmetic coding, Huffman coding, context-adaptive binary arithmetic coding, or any other lossless compression algorithm). In some embodiments, besides prediction data 206 and quantized transform coefficients 216, the decoder can decode other information at binary decoding stage 302, such as, for example, a prediction mode, parameters of the prediction operation, a transform type, parameters of the quantization process (e.g., quantization parameters), an encoder control parameter (e.g., a bitrate control parameter), or the like. In some embodiments, if video bitstream 228 is transmitted over a network in packets, the decoder can depacketize video bitstream 228 before feeding it to binary decoding stage 302.

Figure 3B:
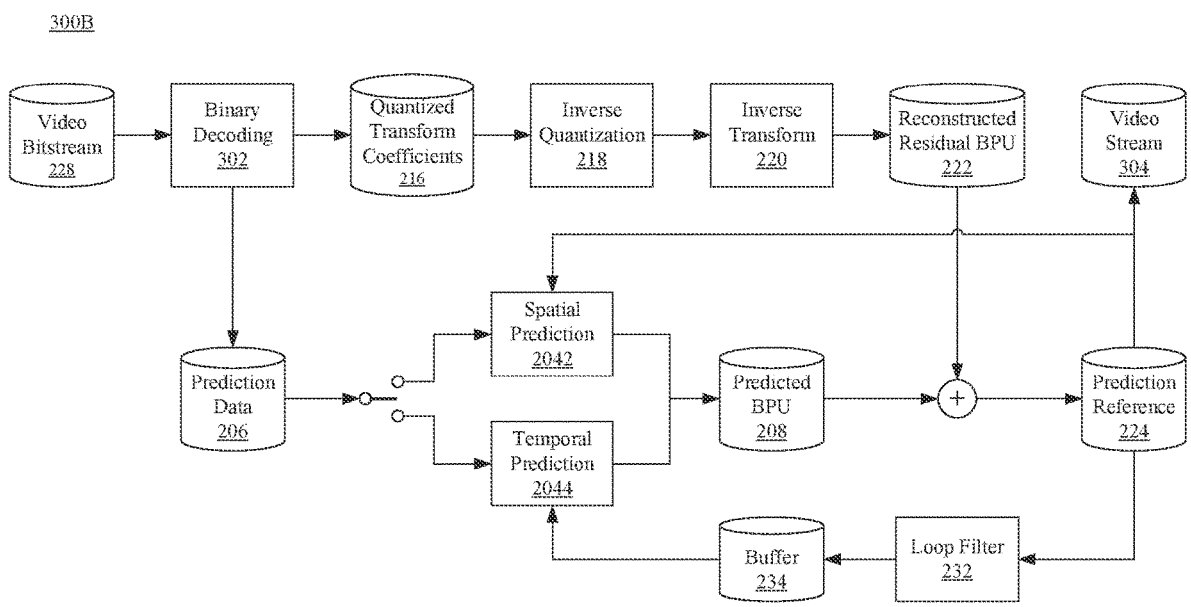
FIG. 3B is a schematic diagram illustrating another exemplary decoding process of a hybrid video coding system, consistent with some embodiments of the present disclosure.

FIG. 3B illustrates a schematic diagram of another example decoding process 300B, consistent with embodiments of the disclosure. Process 300B can be modified from process 300A. For example, process 300B can be used by a decoder conforming to a hybrid video coding standard (e.g., H.26x series). Compared with process 300A, process 300B additionally divides prediction stage 204 into spatial prediction stage 2042 and temporal prediction stage 2044, and additionally includes loop filter stage 232 and buffer 234.

In process 300B, for an encoded basic processing unit (referred to as a "current BPU") of an encoded picture (referred to as a "current picture") that is being decoded, prediction data 206 decoded from binary decoding stage 302 by the decoder can include various types of data, depending on what prediction mode was used to encode the current BPU by the encoder. For example, if intra prediction was used by the encoder to encode the current BPU, prediction data 206 can include a prediction mode indicator (e.g., a flag value) indicative of the intra prediction, parameters of the intra prediction operation, or the like. The parameters of the intra prediction operation can include, for example, locations (e.g., coordinates) of one or more neighboring BPUs used as a reference, sizes of the neighboring BPUs, parameters of extrapolation, a direction of the neighboring BPUs with respect to the original BPU, or the like. For another example, if inter prediction was used by the encoder to encode the current BPU, prediction data 206 can include a prediction mode indicator (e.g., a flag value) indicative of the inter prediction, parameters of the inter prediction operation, or the like. The parameters of the inter prediction operation can include, for example, the number of reference pictures associated with the current BPU, weights respectively associated with the reference pictures, locations (e.g., coordinates) of one or more matching regions in the respective reference pictures, one or more motion vectors respectively associated with the matching regions, or the like.

Based on the prediction mode indicator, the decoder can decide whether to perform a spatial prediction (e.g., the intra prediction) at spatial prediction stage 2042 or a temporal prediction (e.g., the inter prediction) at temporal prediction stage 2044. The details of performing such spatial prediction or temporal prediction are described in FIG. 2B and will not be repeated hereinafter. After performing such spatial prediction or temporal prediction, the decoder can generate predicted BPU 208. The decoder can add predicted BPU 208 and reconstructed residual BPU 222 to generate prediction reference 224, as described in FIG. 3A.

In process 300B, the decoder can feed predicted reference 224 to spatial prediction stage 2042 or temporal prediction stage 2044 for performing a prediction operation in the next iteration of process 300B. For example, if the current BPU is decoded using the intra prediction at spatial prediction stage 2042, after generating prediction reference 224 (e.g., the decoded current BPU), the decoder can directly feed prediction reference 224 to spatial prediction stage 2042 for later usage (e.g., for extrapolation of a next BPU of the current picture). If the current BPU is decoded using the inter prediction at temporal prediction stage 2044, after generating prediction reference 224 (e.g., a reference picture in which all BPUs have been decoded), the encoder can feed prediction reference 224 to loop filter stage 232 to reduce or eliminate distortion (e.g., blocking artifacts). The decoder can apply a loop filter to prediction reference 224, in a way as described in FIG. 2B. The loop-filtered reference picture can be stored in buffer 234 (e.g., a decoded picture buffer in a computer memory) for later use (e.g., to be used as an inter-prediction reference picture for a future encoded picture of video bitstream 228). The decoder can store one or more reference pictures in buffer 234 to be used at temporal prediction stage 2044. In some embodiments, when the prediction mode indicator of prediction data 206 indicates that inter prediction was used to encode the current BPU, prediction data can further include parameters of the loop filter (e.g., a loop filter strength).

Figure 4:
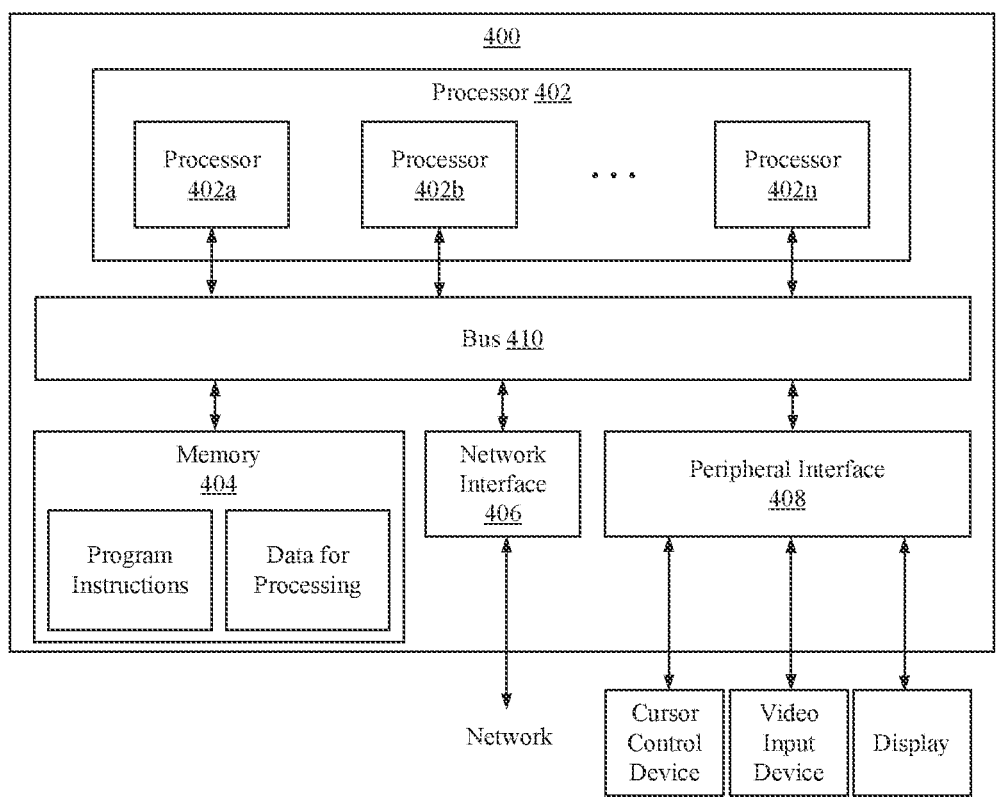
FIG. 4 is a block diagram of an exemplary apparatus for encoding or decoding a video, consistent with some embodiments of the present disclosure.

FIG. 4 is a block diagram of an example apparatus 400 for encoding or decoding a video, consistent with embodiments of the disclosure. As shown in FIG. 4, apparatus 400 can include processor 402. When processor 402 executes instructions described herein, apparatus 400 can become a specialized machine for video encoding or decoding. Processor 402 can be any type of circuitry capable of manipulating or processing information. For example, processor 402 can include any combination of any number of a central processing unit (or "CPU"), a graphics processing unit (or "GPU"), a neural processing unit ("NPU"), a microcontroller unit ("MCU"), an optical processor, a programmable logic controller, a microcontroller, a microprocessor, a digital signal processor, an intellectual property (IP) core, a Programmable Logic Array (PLA), a Programmable Array Logic (PAL), a Generic Array Logic (GAL), a Complex Programmable Logic Device (CPLD), a Field-Programmable Gate Array (FPGA), a System On Chip (SoC), an Application-Specific Integrated Circuit (ASIC), or the like. In some embodiments, processor 402 can also be a set of processors grouped as a single logical component. For example, as shown in FIG. 4, processor 402 can include multiple processors, including processor 402a, processor 402b, and processor 402n.

Apparatus 400 can also include memory 404 configured to store data (e.g., a set of instructions, computer codes, intermediate data, or the like). For example, as shown in FIG. 4, the stored data can include program instructions (e.g., program instructions for implementing the stages in processes 200A, 200B, 300A, or 300B) and data for processing (e.g., video sequence 202, video bitstream 228, or video stream 304). Processor 402 can access the program instructions and data for processing (e.g., via bus 410), and execute the program instructions to perform an operation or manipulation on the data for processing. Memory 404 can include a high-speed random-access storage device or a non-volatile storage device. In some embodiments, memory 404 can include any combination of any number of a random-access memory (RAM), a read-only memory (ROM), an optical disc, a magnetic disk, a hard drive, a solid-state drive, a flash drive, a security digital (SD) card, a memory stick, a compact flash (CF) card, or the like. Memory 404 can also be a group of memories (not shown in FIG. 4) grouped as a single logical component.

Bus 410 can be a communication device that transfers data between components inside apparatus 400, such as an internal bus (e.g., a CPU-memory bus), an external bus (e.g., a universal serial bus port, a peripheral component interconnect express port), or the like.

For ease of explanation without causing ambiguity, processor 402 and other data processing circuits are collectively referred to as a "data processing circuit" in this disclosure. The data processing circuit can be implemented entirely as hardware, or as a combination of software, hardware, or firmware. In addition, the data processing circuit can be a single independent module or can be combined entirely or partially into any other component of apparatus 400.

Apparatus 400 can further include network interface 406 to provide wired or wireless communication with a network (e.g., the Internet, an intranet, a local area network, a mobile communications network, or the like). In some embodiments, network interface 406 can include any combination of any number of a network interface controller (NIC), a radio frequency (RF) module, a transponder, a transceiver, a modem, a router, a gateway, a wired network adapter, a wireless network adapter, a Bluetooth adapter, an infrared adapter, an near-field communication ("NFC") adapter, a cellular network chip, or the like.

In some embodiments, optionally, apparatus 400 can further include peripheral interface 408 to provide a connection to one or more peripheral devices. As shown in FIG. 4, the peripheral device can include, but is not limited to, a cursor control device (e.g., a mouse, a touchpad, or a touchscreen), a keyboard, a display (e.g., a cathode-ray tube display, a liquid crystal display, or a light-emitting diode display), a video input device (e.g., a camera or an input interface coupled to a video archive), or the like.

It should be noted that video codecs (e.g., a codec performing process 200A, 200B, 300A, or 300B) can be implemented as any combination of any software or hardware modules in apparatus 400. For example, some or all stages of process 200A, 200B, 300A, or 300B can be implemented as one or more software modules of apparatus 400, such as program instructions that can be loaded into memory 404. For another example, some or all stages of process 200A, 200B, 300A, or 300B can be implemented as one or more hardware modules of apparatus 400, such as a specialized data processing circuit (e.g., an FPGA, an ASIC, an NPU, or the like).

In a first reference embodiment, a sequence parameter set (SPS) syntax element sps_max_luma_transform_size_64_flag is signaled to specify the maximum transform size. sps_max_luma_transform_size_64_flag equal to 1 specifies that the maximum transform size in luma samples is equal to 64. sps_max_luma_transform_size_64_flag equal to 0 specifies that the maximum transform size in luma samples is equal to 32. In the first reference embodiment, the sps_max_luma_transform_size_64_flag is always signaled regardless of the value of the coded tree block size (CtbSizeY). However, sps_max_luma_transform_size_64_flag is not required to be signaled and can be inferred to be 0 if CtbSizeY is less than 64.

Moreover, in a second reference embodiment, a slice level residual coding selection method can be used. The following are exemplary semantics of the slice_ts_residual_coding_disabled_flag:
slice_ts_residual_coding_disabled_flag equal to 1 specifies that the residual_coding ( ) syntax structure is used to parse the residual samples of a transform skip block for the current slice. slice_ts_residual_coding_disabled_flag equal to 0 specifies that the residual_ts_coding( ) syntax structure is used to parse the residual samples of a transform skip block for the current slice. When slice_ts_residual_coding_disabled_flag is not present, it is infered to be equal to 0.

In the second reference embodiment, the slice_ts_residual_coding_disabled_flag is always signaled. However, because the slice_ts_residual_coding_disabled_flag specifies the residual coding method of transform skip mode, if the transform skip mode is disabled at the SPS level, it is not required to signal slice_ts_residual_coding_disabled_flag in the slice header and can be inferred to be 0.

The present disclosure provides methods and apparatus to reduce the above-described coding redundancy.

Figure 5A:
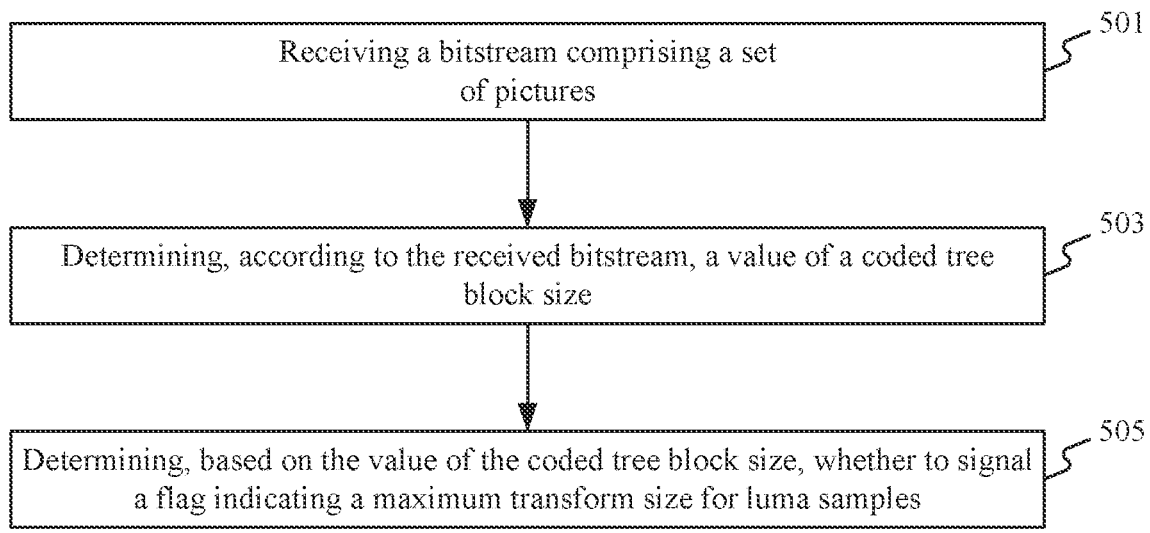
FIG. 5A is an exemplary method for signaling a maximum transform size, consistent with some embodiments of the present disclosure.

FIG. 5A is an exemplary method for signaling a maximum transform size, consistent with some embodiments of the present disclosure. In some embodiments, method 500A can be performed by an encoder, a decoder, and one or more software or hardware components of an apparatus (e.g., apparatus 400 of FIG. 4). For example, a processor (e.g., processor 402 of FIG. 4) can perform method 500A. In some embodiments, method 500A can be implemented by a computer program product, embodied in a computer-readable medium, including computer-executable instructions, such as program code, executed by computers (e.g., apparatus 400 of FIG. 4). The method can include the following steps.

In step 501, a bitstream comprising a set of pictures is received. As described, a basic processing unit of a color picture can include a luma component (Y) representing achromatic brightness information, one or more chroma components (e.g., Cb and Cr) representing color information, and associated syntax elements, in which the luma and chroma components can have the same size of the basic processing unit. The luma and chroma components can be referred to as "coding tree blocks" ("CTBs") in some video coding standards (e.g., H.265/HEVC or H.266/VVC). Any operation performed to a basic processing unit can be repeatedly performed to each of its luma and chroma components.

In step 503, a value of a coded tree block size is determined according to the received bitstream. The value of the coded tree block size is signaled in the received bitstream. For example, a value of CtbSizeY in exemplary semantics is determined.

In step 505, whether to signal a flag indicating a maximum transform size for luma samples is determined based on the value of the coded tree block size. For example, a sequence parameter set (SPS) syntax element sps_max_luma_transform_size_64_flag can be used for specifying the maximum transform size. sps_max_luma_transform_size_64_flag equal to 1 specifies that the maximum transform size in luma samples is equal to 64. sps_max_luma_transform_size_64_flag equal to 0 specifies that the maximum transform size in luma samples is equal to 32.

Figure 5B:
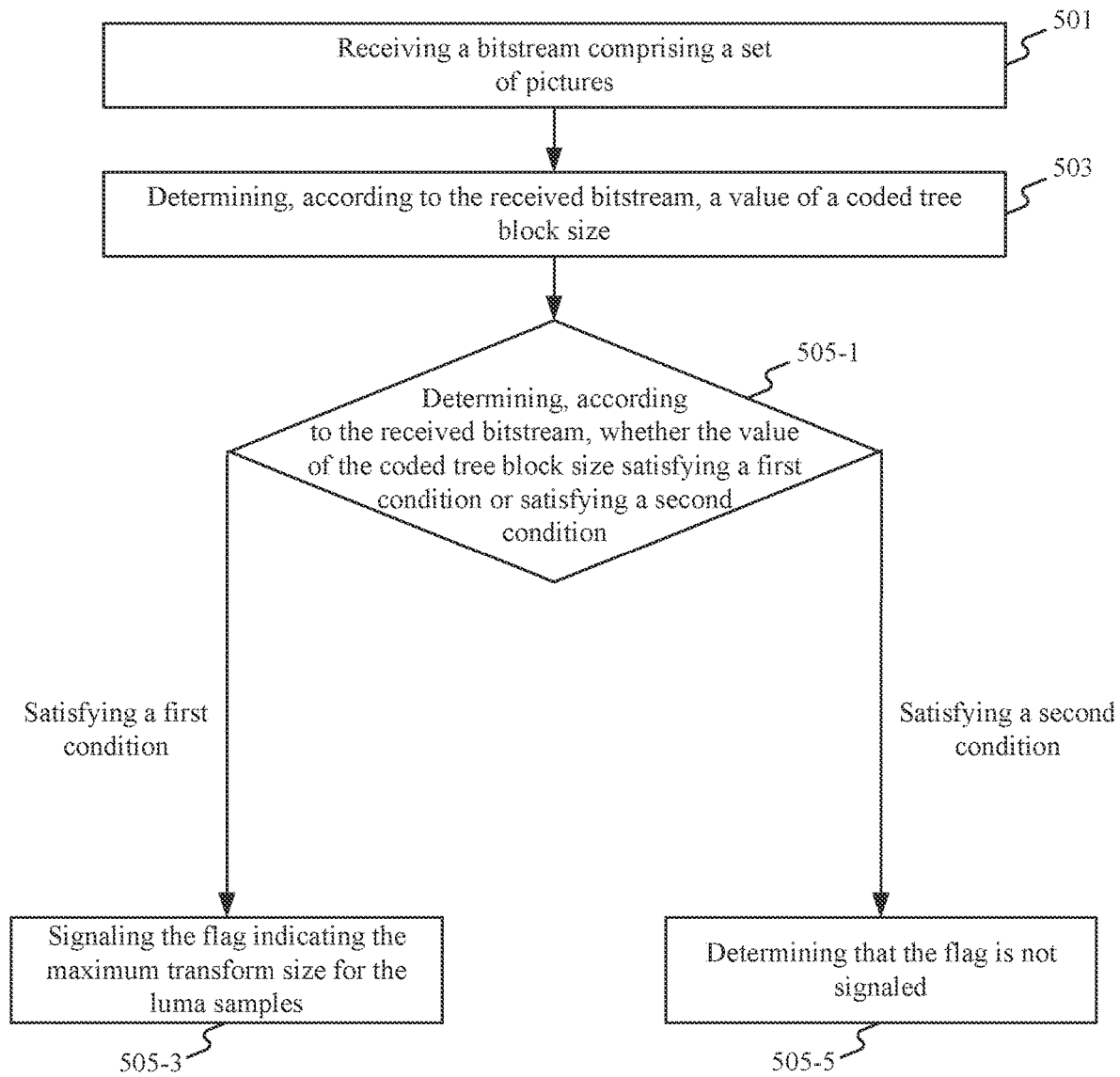
FIG. 5B is an exemplary method for signaling a maximum transform size, consistent with some embodiments of the present disclosure.

In some embodiments, step 505 can include steps 505-1, 505-3, and 505-5 as shown in FIG. 5B.

In step 505-1, whether the value of the coded tree block size satisfying a first condition or satisfying a second condition is determined according to the received bitstream.

In some embodiments, the first condition can be the value being greater than 32, and the second condition can be the value being less than or equal to 32. Satisfying the first condition can lead to signaling the flag indicating the maximum transform size. Otherwise, satisfying the second condition can lead to a determination that the flag is not signaled.

In step 505-3, in response to the value of the coded tree block size being greater than 32, the flag is signaled.

An exemplary SPS syntax is described below in Table 1. In some exemplary embodiments for signaling the maximum transform size, sps_max_luma_transform_size_64_flag is signaled only when CtbSizeY is greater than 32. Table 1 shows a part of an exemplary SPS syntax table for signaling a maximum transform size, according to some disclosed embodiments. In Table 1, the line with "if (CtbSizeY>32)" shows changes to the syntax used for the first reference embodiment. As described, in the first reference embodiment, the sps_max_luma_transform_size_64_flag is always signaled regardless of the value of the coded tree block size (CtbSizeY). In contrast, according to some embodiments of the present disclosure, the sps_max_luma_transform_size_64_flag is not always signaled. As shown in Table 1, signaling of the sps_max_luma_transform_size_64 flag is conditioned to CtbSizeY.

TABLE 1

Exemplary SPS syntax table of disclosed method for signaling maximum transform size

```
if( qtbtt_dual_tree_intra_flag ) {
    sps_log2_diff_min_qt_min_cb_intra_slice_chroma        ue(v)
    sps_max_mtt_hierarchy_depth_intra_slice_chroma        ue(v)
    if( sps_max_mtt_hierarchy_depth_intra_slice_chroma != 0 ) {
        sps_log2_diff_max_bt_min_qt_intra_slice_chroma    ue(v)
        sps_log2_diff_max_tt_min_qt_intra_slice_chroma    ue(v)
    }
}
if (CtbSizeY > 32)
    sps_max_luma_transform_size_64_flag                   u(1)
if( ChromaArrayType != 0 ) {
    sps_joint_cbcr_enabled_flag                           u(1)
    same_qp_table_for_chroma                              u(1)
    numQpTables = same_qp_table_for_chroma ? 1 : (
sps_joint_cbcr_enabled_flag ? 3 : 2 )
    for( i = 0; i < numQpTables; i++ ) {
        qp_table_start_minus26[ i ]                       se(v)
        num_points_in_qp_table_minus1[ i ]                ue(v)
        for( j = 0; j <= num_points_in_qp_table_minus1[ i ]; j++ ) {
            delta_qp_in_val_minus1[ i ][ j ]              ue(v)
            delta_qp_diff_val[ i ][ j ]                   ue(v)
        }
    }
}
```

In step 505-5, in response to the value of the coded tree block size being less than or equal to 32, it is determined that the flag is not signaled.

In the signaling method consistent with Table 1, if the CtbSize Y is not greater than 32, the value of sps_max_luma_transform_size_64_flag is inferred to be 0. The semantics for deriving CtbSizeY are shown below.

sps_log2_ctu_size_minus plus 5 specifies the luma coding tree block size of each CTU. The value of sps_log2_ctu_size_minus5 shall be in the range of 0 to 2, inclusive. The value 3 for sps_log2_ctu_size_ minus5 is reserved for future use by ITU-T | ISO/IEC.
The variables CtbLog2SizeY and CtbSizeY are derived as follows:
    CtbLog2SizeY = sps log2_ctu size minus5 + 5
    CtbSizeY = 1 << CtbLog2SizeY In some embodiments, the first condition and the second condition can be different from what is described above. In the example below, the first condition can be the value being not equal to 32, and the second condition can be the value being equal to 32.

In an alternative step of step 505-3, in response to the value of the coded tree block size being not equal to 32, the flag is signaled.

In an alternative step of step 505-5, in response to the value of the coded tree block size being equal to 32, it is determined that the flag is not signaled.

An exemplary syntax is described as follows. The proposed syntax change shown in Table 1 can also be implemented using the condition "CtbSizeY!=32" instead of "CtbSizeY>32". In this case: sps_max_luma_transform_size_64_flag is signaled if CtbSizeY is not equal to 32; and sps_max_luma_transform_size_64_flag is inferred to be 0 if CtbSizeY is equal to 32.

An exemplary syntax is described as follows. The proposed syntax change shown in Table 1 can also be implemented using the condition "CtbSizeY>64" instead of "CtbSizeY>32". In this case: sps_max_luma_transform_size_64_flag is signaled if CtbSizeY is greater or equal to 64; and sps_max_luma_transform_size_64_flag is inferred to be 0 if CtbSizeY is less than 64. In other words, the sps_max_luma_transform_size 64_flag is only required to signal if CtbSizeY is larger than 32. If CtbSizeY is not larger than 32, sps_max_luma_transform_size_64 flag is not signaled and inferred to be equal to 0. alternatively, sps_max_luma_transform_size_64_flag is only signaled if CtbSizeY is greater or equal to 64. If CtbSizeY is less than 64, sps_max_luma_transform_size_64_flag is not signaled and inferred to be equal to 0.

In some exemplary embodiments for signaling the maximum transform size, instead of using CtbSizeY, signaling of the sps_max_luma_transform_size_64_flag is conditioned to sps_log2_ctu_size_minus5. As described above, sps_log2_ctu_size_minus5 plus 5 specifies the luma coding tree block size of each Coded Tree Unit (CTU). A CTU can be as large as 128×128 luma samples (plus the corresponding chroma samples depending on the chroma format). Table 2 below shows a part of an exemplary SPS syntax table for signaling a maximum transform size, according to some disclosed embodiments. In Table 2, the line with "if (sps_log2_ctu_size_minus5>0)" shows changes to the syntax used for the first reference embodiment. As described, in the first reference embodiment, the sps_max_luma_transform_size_64 flag is always signaled regardless of the value of the coded tree block size (e.g., CtbSizeY). In contrast, according to some embodiments of the present disclosure, the sps_max_luma_transform_size_64_flag is not always signaled. As shown in Table 2, in some embodiments, signaling of the sps_max_luma_transform_size_64_flag is conditioned to sps_log2_ctu_size_minus5. As Table 2 shows, sps_max_luma_transform_size_64 flag is signaled if sps_log2_ctu_size_minus5 is greater than 0; and the value of sps_max_luma_transform_size_64_flag is inferred to be 0 if sps_log2_ctu_size_minus5 is 0.

In some embodiments, the value of the coded tree block size in step 501 can further comprise a value associated with a luma coding tree block size of each coded tree unit. The value (e.g., sps_log2_ctu_size_minus5) can be determined according to the received bitstream.

In some embodiments, in an alternative step of step 505-1, whether the value associated with the luma coding tree block size of each coded tree unit satisfying a first condition (e.g., being greater than 0) or a second condition (e.g., being equal to 0) can be determined.

In some embodiments, in an alternative step of step 505-3, in response to the value associated with the luma coding tree block size of each coded tree unit satisfying the first condition (e.g., being greater than 0), the flag (e.g., sps_max_luma_transform_size_64_flag) is signaled.

In some embodiments, in an alternative step of step 505-5, in response to the value associated with the luma coding tree block size of each coded tree unit satisfying the second condition (e.g., being equal to 0), it is determined that the flag (e.g., sps_max_luma_transform_size_64_flag) is not signaled.

TABLE 2

Exemplary SPS syntax table of disclosed method for signaling maximum transform size

| |
|---|
| if( qtbtt_dual_tree_intra_flag ) { |
|   sps_log2_diff_min_qt_min_cb_intra_slice_chroma    ue(v) |
|   sps_max_mtt_hierarchy_depth_intra_slice_chroma    ue(v) |
|   if( sps_max_mtt_hierarchy_depth_intra_slice_chroma != 0 ) { |
|     sps_log2_diff_max_bt_min_qt_intra_slice_chroma    ue(v) |
|     sps_log2_diff_max_tt_min_qt_intra_slice_chroma    ue(v) |
|   } |
| } |
| if (sps_log2_ctu_size_minus5 > 0) |
|   sps_max_luma_transform_size_64_flag    u(1) |
| if( ChromaArrayType != 0 ) { |
|   sps_joint_cbcr_enabled_flag    u(1) |
|   same_qp_table_for_chroma    u(1) |
|   numQpTables = same_qp_table_for_chroma ? 1 : ( sps_joint_cbcr_enabled_flag ? 3 : 2 ) |
|   for( i = 0; i < numQpTables; i++ ) { |
|     qp_table_start_minus26[ i ]    se(v) |
|     num_points_in_qp_table_minus1[ i ]    ue(v) |
|     for(j = 0; j <= num_points_in_qp_table_minus1[ i ]; j++ ) { |
|       delta_qp_in_val_minus1[ i ][ j ]    ue(v) |
|       delta_qp_diff_val[ i ][ j ]    ue(v) |
|     } |
|   } |
| } |

The above syntax changes shown in Table 2 can also be implemented using the condition "sps_log2_ctu_size_minus5!=0". In this case: sps_max_luma_transform_size_64_flag is signaled if sps_log2_ctu_size_minus5 is not equal to 0; and sps_max_luma_transform_size_64_flag is inferred to be 0 if sps_log2_ctu_size_minus5 is equal to 0.

In some embodiments, the first condition can also be the value (e.g., sps_log2_ctu_size_minus5) being not equal to 0 as shown in the example above. In an alternative step of step 505-3, in response to the value associated with the luma coding tree block size of each coded tree unit satisfying the first condition (e.g., sps_log2_ctu_size_minus5!=0), the flag (e.g., sps_max_luma_transform_size_64_flag) is signaled.

Figure 6A:
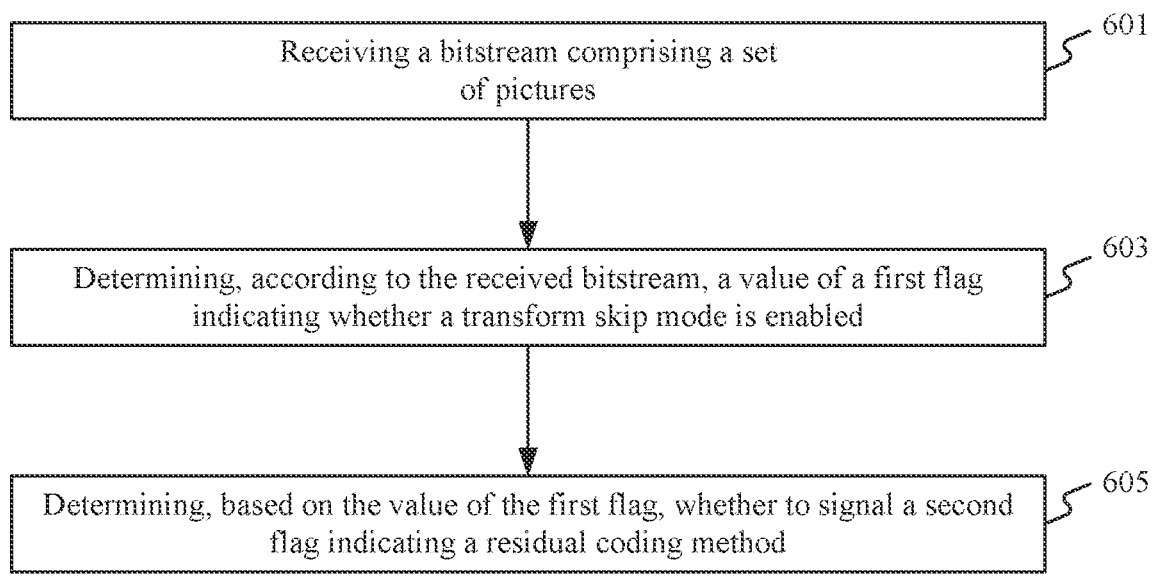
FIG. 6A is an exemplary method for signaling a residual coding method, consistent with some embodiments of the present disclosure.

FIG. 6 is an exemplary method for signaling a residue coding method, consistent with some embodiments of the present disclosure. In some embodiments, method 600A can be performed by an encoder, a decoder, and one or more software or hardware components of an apparatus (e.g., apparatus 400 of FIG. 4). For example, a processor (e.g., processor 402 of FIG. 4) can perform method 600A. In some embodiments, method 600A can be implemented by a computer program product, embodied in a computer-readable medium, including computer-executable instructions, such as program code, executed by computers (e.g., apparatus 400 of FIG. 4). The method can include the following steps.

In step 601, a bitstream comprising a set of pictures is received. As described, a basic processing unit of a color picture can include a luma component (Y) representing achromatic brightness information, one or more chroma components (e.g., Cb and Cr) representing color information, and associated syntax elements, in which the luma and chroma components can have the same size of the basic processing unit. The luma and chroma components can be referred to as "coding tree blocks" ("CTBs") in some video coding standards (e.g., H.265/HEVC or H.266/VVC). Any operation performed to a basic processing unit can be repeatedly performed to each of its luma and chroma components.

In step 603, a value of a first flag indicating whether a transform skip mode is enabled is determined according to the received bitstream. The value of the first flag can be signaled in the received bitstream. For example, a value of sps_transform_skip_enabled_flag can be determined.

In step 605, whether to signal a second flag indicating a residual coding method is determined based on the value of the first flag. For example, the second flag can be a slice level residual coding flag. The slice level residual coding flag slice_ts_residual_coding_disabled_flag specifies the residual coding method of transform skip mode. If the transform skip mode is disabled at a SPS level, it is not required to signal slice_ts_residual_coding_disabled_flag in the slice header and can be inferred to be 0.

Figure 6B:
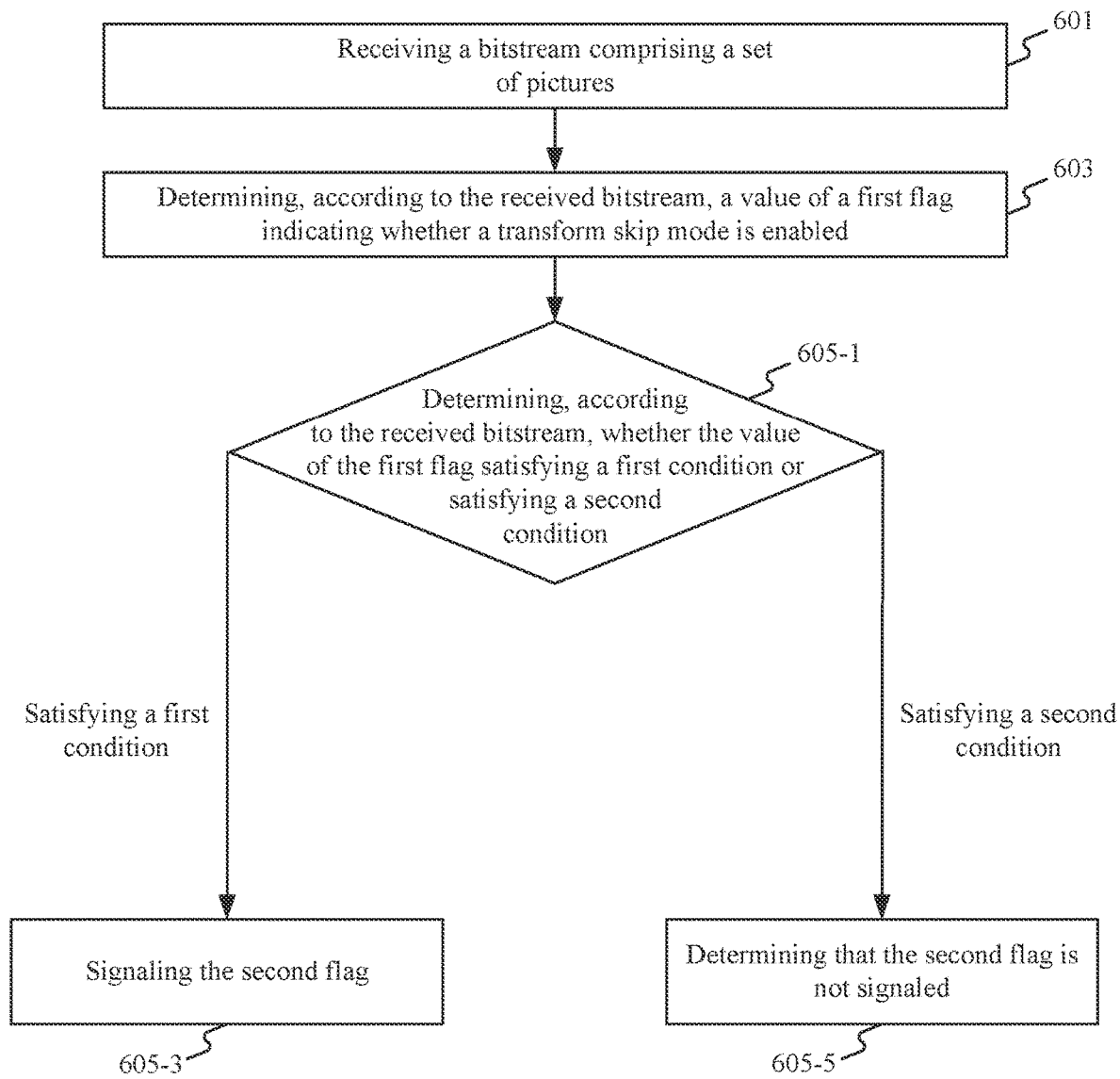
FIG. 6B is an exemplary method for signaling a residual coding method, consistent with some embodiments of the present disclosure.

In some embodiments, step 605 can include steps 605-1, 605-3, and 605-5 as shown in FIG. 6B.

In step 605-1, whether the value of the first flag satisfying a first condition or satisfying a second condition is determined according to the received bitstream.

In some embodiments, the first condition can be the value of the first flag being 1, and the second condition can be the value of the first flag being 0. Satisfying the first condition can lead to signaling the second flag. Otherwise, satisfying the second condition can lead to a determination that the second flag is not signaled.

In step 605-3, in response to the value of the first flag (e.g., sps_transform_skip_enabled_flag) being 1, the second flag (e.g., slice_ts_residual_coding_disabled_flag) is signaled.

In step 605-5, in response to the value of the first flag (e.g., sps_transform_skip_enabled_flag) being 0, it is determined that the second flag (e.g., slice_ts_residual_coding_disabled_flag) is not signaled.

An exemplary SPS syntax is described below in Table 3. In some exemplary embodiments for signaling the residual coding method, the slice level residual coding flag slice_ts_residual_coding_disabled_flag is signaled if sps_transform_skip_enabled_flag is equal to 1. If sps_transform_skip_enabled_flag is equal to 0, the value of slice_ts_residual_coding_disabled_flag is inferred to be 0. The semantics of the sps_transform_skip_enabled_flag are shown below.

sps_transform_skip_enabled_flag equal to 1 specifies that transform_skip_flag may be present in the transform unit syntax. sps_transform_skip_enabled_flag equal to 0 specifies that transform_skip_flag is not present in the transform unit syntax.

Table 3 shows a part of an exemplary slice header syntax table for signaling a residual coding method, according to some disclosed embodiments. In Table 3, the line with "if (sps_transform_skip_enabled_flag)" shows changes to the syntax used for the second reference embodiment. As described, in the second reference embodiment, the slice_ts_residual_coding_disabled_flag is always signaled. In contrast, according to some embodiments of the present disclosure, the slice_ts_residual_coding_disabled_flag is not always signaled. The slice_ts_residual_coding_disabled_flag is only signaled if sps_transform_skip_enabled_flag is equal to 1. If sps_transform_skip_enabled_flag is equal to 0, slice_ts_residual_coding_disabled_flag is not signaled and inferred to be equal to 0. The proposed changes can reduce the signaling overhead at the slice header level.

TABLE 3

Exemplary slice header syntax table of disclosed method for signaling residual coding method

| | |
|---|---|
| if (sps_transform_skip_enabled_flag) | |
|    slice_ts_residual_coding_disabled_flag | u(1) |
| if( ph_lmcs_enabled_flag ) | |
|    slice_lmcs_enabled_flag | u(1) |
| if( pic_scaling_list_enabled_flag ) | |
|    slice_scaling_list_present_flag | u(1) |

In some embodiments, a non-transitory computer-readable storage medium including instructions is also provided, and the instructions may be executed by a device (such as the disclosed encoder and decoder), for performing the above-described methods. Common forms of non-transitory media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM or any other flash memory, NVRAM, a cache, a register, any other memory chip or cartridge, and networked versions of the same. The device may include one or more processors (CPUs), an input/output interface, a network interface, and/or a memory.

The disclosed embodiments may further be described using the following clauses:

1. A video data signaling method, comprising:
receiving a bitstream comprising a set of pictures;
determining, according to the received bitstream, a value of a coded tree block size; and
determining, based on the value of the coded tree block size, whether to signal a flag indicating a maximum transform size for luma samples.

2. The method of clause 1, wherein determining whether to signal the flag comprises:
in response to the value of the coded tree block size being greater than 32, signaling the flag; or
in response to the value of the coded tree block size being less than or equal to 32, determining that the flag is not signaled.

3. The method of clause 1, wherein determining whether to signal the flag comprises:
in response to the value of the coded tree block size being not equal to 32, signaling the flag; or
in response to the value of the coded tree block size being equal to 32, determining that the flag is not signaled.

4. The method of clause 1, wherein the value of the coded tree block size further comprises a value associated with a luma coding tree block size of a coded tree unit.

5. The method of clause 4, wherein determining whether to signal the flag comprises:
in response to the value associated with the luma coding tree block size being greater than 0, signaling the flag; or
in response to the value associated with the luma coding tree block size being equal to 0, determining that the flag is not signaled.

6. The method of clause 4, wherein determining whether to signal the flag comprises:
in response to the value associated with the luma coding tree block size being not equal to 0, signaling the flag; or
in response to the value associated with the luma coding tree block size being equal to 0, determining that the flag is not signaled.

7. The method of any of clauses 1-6, wherein the flag indicates that the maximum transform size is 64.

8. A video data signaling method, comprising:
receiving a bitstream comprising a set of pictures;
determining, according to the received bitstream, a value of a first flag indicating whether a transform skip mode is enabled; and
determining, based on the value of the first flag, whether to signal a second flag indicating a residual coding method.

9. The method of clause 8, wherein determining whether to signal the second flag comprises:
in response to the value of the first flag being 1, signaling the second flag; or
in response to the value of the first flag being 0, determining that the second flag is not signaled.

10. The method of any of clauses 8 and 9, wherein:
the first flag is signaled in a sequence parameter set, and the second flag is signaled in a slice header.

11. A video data signaling apparatus comprising:
a memory storing a set of instructions; and
one or more processors configured to execute the set of instructions to cause the apparatus to perform:
receiving a bitstream comprising a set of pictures,
determining, according to the received bitstream, a value of a coded tree block size; and
determining, based on the value of the coded tree block size, whether to signal a flag indicating a maximum transform size for luma samples.

12. The apparatus of clause 11, wherein in determining whether to signal the flag, the one or more processors are configured to execute the set of instructions to cause the apparatus to further perform:
in response to the value of the coded tree block size being greater than 32, signaling the flag, or
in response to the value of the coded tree block size being less than or equal to 32, determining that the flag is not signaled.

13. The apparatus of clause 11, wherein in determining whether to signal the flag, the one or more processors are configured to execute the set of instructions to cause the apparatus to further perform:
in response to the value of the coded tree block size being not equal to 32, signaling the flag; or
in response to the value of the coded tree block size being equal to 32, determining that the flag is not signaled.

14. The apparatus of clause 11, wherein the value of the coded tree block size further comprises a value associated with a luma coding tree block size of a coded tree unit.

15. The apparatus of clause 14, wherein in determining whether to signal the flag, the one or more processors are configured to execute the set of instructions to cause the apparatus to further perform:
in response to the value associated with the luma coding tree block size being greater than 0, signaling the flag; or
in response to the value associated with the luma coding tree block size being equal to 0, determining that the flag is not signaled.

16. The apparatus of clause 14, wherein in determining whether to signal the flag, the one or more processors are configured to execute the set of instructions to cause the apparatus to further perform:

in response to the value associated with the luma coding tree block size being not equal to 0, signaling the flag; or in response to the value associated with the luma coding tree block size being equal to 0, determining that the flag is not signaled.

17. The apparatus of any of clauses 11-16, wherein the flag indicates that the maximum transform size is 64.

18. A video data signaling apparatus comprising:
a memory storing a set of instructions; and
one or more processors configured to execute the set of instructions to cause the apparatus to perform:
receiving a bitstream comprising a set of pictures,
determining, according to the received bitstream, a value of a first flag indicating whether a transform skip mode is enabled; and
determining, based on the value of the first flag, whether to signal a second flag indicating a residual coding method.

19. The apparatus of clause 18, wherein in determining whether to signal the second flag, the one or more processors are configured to execute the set of instructions to cause the apparatus to further perform:
in response to the value of the first flag being 1, signaling the second flag; or
in response to the value of the first flag being 0, determining that the second flag is not signaled.

20. The apparatus of any of clauses 18 and 19, wherein:
the first flag is signaled in a sequence parameter set, and
the second flag is signaled in a slice header.

21. A non-transitory computer readable medium that stores a set of instructions that is executable by at least one processor of a computer to cause the computer to perform a video data signaling method, the method comprising:
receiving a bitstream comprising a set of pictures;
determining, according to the received bitstream, a value of a coded tree block size; and
determining, based on the value of the coded tree block size, whether to signal a flag indicating a maximum transform size for luma samples.

22. The non-transitory computer readable medium of clause 21, wherein determining whether to signal the flag comprises:
in response to the value of the coded tree block size being greater than 32, signaling the flag; or
in response to the value of the coded tree block size being less than or equal to 32, determining that the flag is not signaled.

23. The non-transitory computer readable medium of clause 21, wherein determining whether to signal the flag comprises:
in response to the value of the coded tree block size being not equal to 32, signaling the flag; or
in response to the value of the coded tree block size being equal to 32, determining that the flag is not signaled.

24. The non-transitory computer readable medium of clause 21, the value of the coded tree block size further comprises a value associated with a luma coding tree block size of a coded tree unit.

25. The non-transitory computer readable medium of clause 24, wherein determining whether to signal the flag comprises:
in response to the value associated with the luma coding tree block size being greater than 0, signaling the flag; or in response to the value associated with the luma coding tree block size being equal to 0, determining that the flag is not signaled.

26. The non-transitory computer readable medium of clause 24, wherein determining whether to signal the flag comprises:
in response to the value associated with the luma coding tree block size being not equal to 0, signaling the flag; or
in response to the value associated with the luma coding tree block size being equal to 0, determining that the flag is not signaled.

27. The non-transitory computer readable medium of any of clauses 21-26, wherein the flag indicates that the maximum transform size is 64.

28. A non-transitory computer readable medium that stores a set of instructions that is executable by at least one processor of a computer to cause the computer to perform a video data signaling method, the method comprising:
receiving a bitstream comprising a set of pictures,
determining, according to the received bitstream, a value of a first flag indicating whether a transform skip mode is enabled; and
determining, based on the value of the first flag, whether to signal a second flag indicating a residual coding method.

29. The non-transitory computer readable medium of clause 28, wherein determining whether to signal the second flag comprises:
in response to the value of the first flag being 1, signaling the second flag; or
in response to the value of the first flag being 0, determining that the second flag is not signaled.

30. The non-transitory computer readable medium of any of clauses 28 and 29, wherein:
the first flag is signaled in a sequence parameter set, and
the second flag is signaled in a slice header.

It should be noted that, the relational terms herein such as "first" and "second" are used only to differentiate an entity or operation from another entity or operation, and do not require or imply any actual relationship or sequence between these entities or operations. Moreover, the words "comprising," "having," "containing," and "including," and other similar forms are intended to be equivalent in meaning and be open ended in that an item or items following any one of these words is not meant to be an exhaustive listing of such item or items, or meant to be limited to only the listed item or items.

As used herein, unless specifically stated otherwise, the term "or" encompasses all possible combinations, except where infeasible. For example, if it is stated that a database may include A or B, then, unless specifically stated otherwise or infeasible, the database may include A, or B, or A and B. As a second example, if it is stated that a database may include A, B, or C, then, unless specifically stated otherwise or infeasible, the database may include A, or B, or C, or A and B, or A and C, or B and C, or A and B and C.

It is appreciated that the above described embodiments can be implemented by hardware, or software (program codes), or a combination of hardware and software. If implemented by software, it may be stored in the above-described computer-readable media. The software, when executed by the processor can perform the disclosed methods. The computing units and other functional units described in this disclosure can be implemented by hardware, or software, or a combination of hardware and software. One of ordinary skill in the art will also understand that multiple ones of the above described modules/units may be combined as one module/unit, and each of the above described modules/units may be further divided into a plurality of sub-modules/sub-units.

In the foregoing specification, embodiments have been described with reference to numerous specific details that can vary from implementation to implementation. Certain adaptations and modifications of the described embodiments can be made. Other embodiments can be apparent to those skilled in the art from consideration of the specification and practice of the invention disclosed herein. It is intended that the specification and examples be considered as exemplary only, with a true scope and spirit of the invention being indicated by the following claims. It is also intended that the sequence of steps shown in figures are only for illustrative purposes and are not intended to be limited to any particular sequence of steps. As such, those skilled in the art can appreciate that these steps can be performed in a different order while implementing the same method.

In the drawings and specification, there have been disclosed exemplary embodiments. However, many variations and modifications can be made to these embodiments. Accordingly, although specific terms are employed, they are used in a generic and descriptive sense only and not for purposes of limitation.

What is claimed is:

1. A method of encoding a video sequence into a bitstream, the method comprising:
   determining a value of a size of a coding tree block;
   determining, based on the value of the coding tree block size, whether to encode a flag indicating a maximum transform size for luma samples; and
   based on the value of the coding tree block size being equal to or less than 32, skipping encoding the flag into a sequence parameter set (SPS) of the bitstream and determining the skipped encoded flag to have a value indicating that the maximum transform size for luma samples is equal to 32.

2. The method according to claim 1, wherein the flag comprises an sps_max_luma_transform_size_64_flag.

3. The method according to claim 1, further comprising encoding the bitstream according to Versatile Video Coding (VVC/H.266) standard.

4. The method according to claim 1, wherein the value of the flag is inferred to be equal to 0 if the value of the coding tree block size is equal to or less than 32.

5. The method according to claim 1, wherein the value of the coding tree block size is determined based on a parameter specifying a luma coding tree block size of each coding tree unit.

6. A video data decoding method, comprising:
   receiving a bitstream associated with a coding tree block;
   determining, based on a value of a size of the coding tree block, whether to decode a flag associated with a maximum transform size for luma samples, the flag being signaled in a sequence parameter set (SPS) of the bitstream; and
   based on the value of the coding tree block size being equal to or less than 32, skipping decoding the flag and inferring the skipped decoded flag to have a value indicating that the maximum transform size for luma samples is equal to 32.

7. The method according to claim 6, wherein the value of the coding tree block size is determined based on a parameter specifying a luma coding tree block size of each coding tree unit.

8. The method according to claim 6, wherein the flag comprises an sps_max_luma_transform_size_64_flag.

9. The method according to claim 6, wherein the flag is comprised in a sequence parameter set.

10. The method according to claim 6, further comprising decoding the bitstream according to Versatile Video Coding (VVC/H.266) standard.

11. The method according to claim 6, further comprising:
    in response to the value of the coding tree block size being equal to or less than 32, inferring the value of the flag to be equal to 0.

12. A method of storing a bitstream of a video sequence, the method comprising:
    generating a bitstream comprising:
      a sequence parameter set (SPS) associated with the video sequence, and
      a syntax element indicating a value of a size of a coding tree block; and
    storing the bitstream in a non-transitory computer readable medium,
    wherein the generating of the bitstream comprises:
      when the value of the coding tree block size is greater than 32, encoding, in the SPS, a flag indicating a maximum transform size for luma samples, a value of the flag being equal to 1 when the maximum transform size for luma samples is equal to 64, or the value of the flag being equal to 0 when the maximum transform size for luma samples is equal to 32; or
      when the value of the coding tree block size is equal to or less than 32, skipping encoding the flag in the SPS and inferring the value of the flag is inferred to be equal to 0.

13. The method according to claim 12, wherein the flag comprises an sps_max_luma_transform_size_64_flag.

14. The method according to claim 12, wherein the bitstream is encoded according to Versatile Video Coding (VVC/H.266) standard.

15. The method according to claim 12, wherein the syntax element comprises an sps_log2_ctu_size_minus5.

* * * * *